United States Patent [19]
Johnson

[11] 3,941,697
[45] Mar. 2, 1976

[54] AUTOMOTIVE COOLING SYSTEM FILTER ASSEMBLY

[76] Inventor: Louis B. Johnson, 309 Boxwood Road, Oceanside, Calif. 92054

[22] Filed: Dec. 30, 1974

[21] Appl. No.: 537,456

[52] U.S. Cl. ............... 210/167; 210/237; 210/463; 210/470
[51] Int. Cl.² ......................................... B01D 29/04
[58] Field of Search ........... 210/167, 232, 237, 238, 210/459, 460, 463, 465, 470

[56] References Cited
UNITED STATES PATENTS

| | | | |
|---|---|---|---|
| 1,155,852 | 10/1915 | Westergren | 210/463 X |
| 1,554,924 | 9/1925 | Shapiro | 210/167 X |
| 1,832,776 | 11/1931 | Hudson | 210/167 X |
| 2,011,031 | 8/1935 | Birch | 210/167 X |
| 2,604,958 | 7/1952 | Leufvenius | 210/459 X |
| 3,834,539 | 9/1974 | Thompson | 210/167 |

*Primary Examiner*—Theodore A. Granger

[57] ABSTRACT

A filter assembly capable of being removably disposed in a resilient hose adjacent a cooling liquid inlet to an automotive radiator for removing foreign particle material entrained with the cooling liquid as the latter circulates, and by such removal permitting the liquid to perform its intended function at maximum efficiency. The assembly includes a generally cylindrical rigid member that serves a two-fold purpose, namely, that of providing a support for a cone-shaped resilient screen, and also as a support for a V-shaped handle. The handle permits inserting of the assembly in a hose and removal therefrom without appreciable stressing of the screen. Stressing of the screen is highly undesirable, as it may result in permanent damage being done thereto.

1 Claim, 4 Drawing Figures

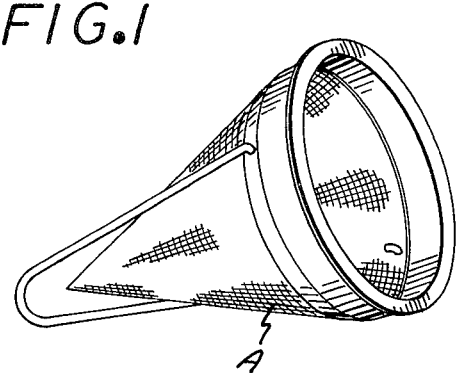
FIG.1
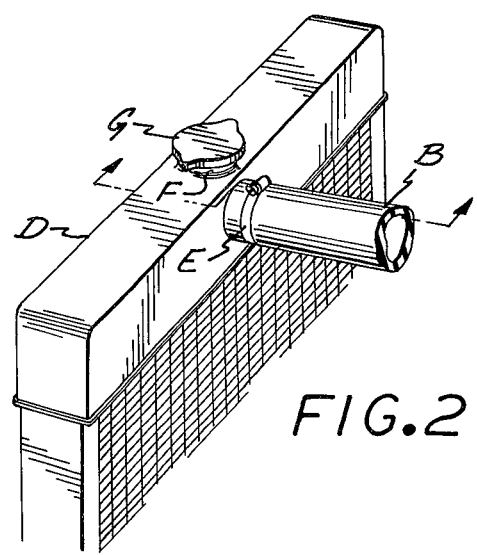
FIG.2
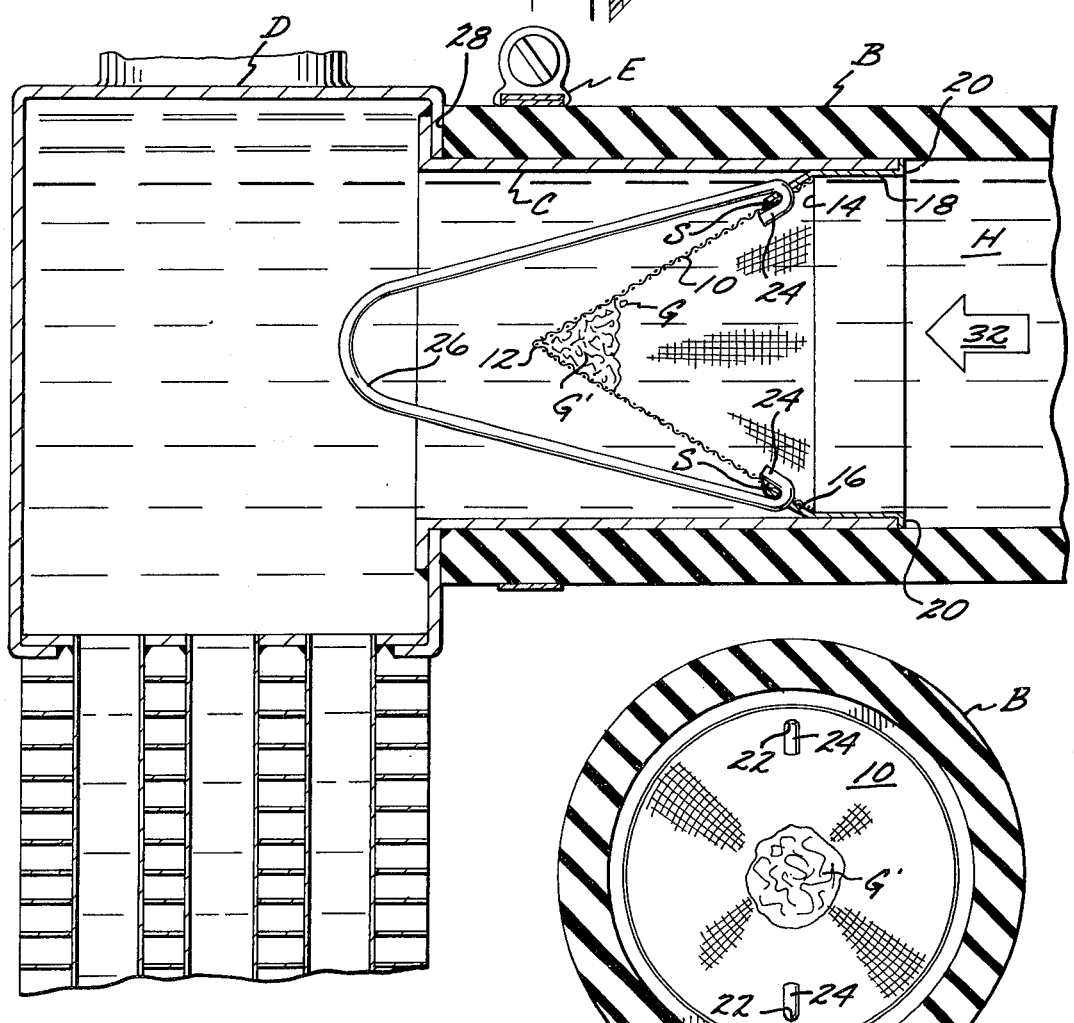
FIG.3
FIG.4

AUTOMOTIVE COOLING SYSTEM FILTER ASSEMBLY

BACKGROUND OF THE INVENTION

1. Field of the Invention

Automotive cooling system filter assembly.

2. Description of the Prior Art

The efficiency of an automotive cooling system is dependent on having the liquid circulating through the radiator lose a maximum amount of heat prior to the liquid discharging from the radiator back to the engine. Such maximum heat loss is achieved when the circulating liquid has maximum surface contact with the metallic interior of the radiator. An automotive radiator, except when new, does not operate at maximum efficiency in removing heat from the circulating liquid, as the liquid will contain particles of foreign material such as rust, sludge, and the like, that are deposited on the interior surface of the radiator, and act as heat regulators. Thus, due to the deposit of such foreign material on the interior surface of the radiator, a substantial quantity of heat is retained in the cooling liquid as it is recirculated back to the engine, and the engine may become overheated as a result thereof. Also, the direction of circulation of the cooling liquid is such that it tends to carry the deposited material to the bottom of the radiator, with the deposited material as it builds up on the bottom resulting in a restricted flow of cooling liquid back to the engine with detrimental results.

The primary purpose in devising the present invention is to provide a simple, inexpensive filter assembly that may be removably mounted in a resilient hose adjacent the liquid inlet to a radiator, and with the assembly when so disposed removing particles of foreign material from the liquid prior to the liquid entering the radiator, and in so doing maintaining the radiator in a condition where it will operate at maximum efficiency in removing heat from the liquid as the latter circulates through the radiator and prior to the liquid being returned to the engine.

SUMMARY OF THE INVENTION

The filter assembly includes a generally cylindrical rigid member that may be removably mounted on a flexible hose adjacent to the liquid inlet on an automotive radiator, and the cylindrical member serving the dual function of acting as a support for a forwardly extending conical screen, as well as a support for a forwardly extending wire handle of V-shaped configuration that extends around the screen. When the filter assembly is positioned as above described, particles of foreign material such as rust, sludge or the like that are entrained with the liquid as it circulates are removed from the liquid prior to the latter entering the automotive radiator.

The handle allows the filter assembly to be positioned in or removed from the flexible hose without appreciable force being exerted on the screen. If the screen is of fine mesh and formed from relatively fine wire, but little force need be exerted on the screen on a local area thereof to permanently deform or damage the screen. Damaging of the screen is subsequently eliminated due to the structure of the present invention.

The efficiency of an automotive radiator is dependent on the circulating liquid having maximum contact with the bare interior surface of the radiator, and it is accordingly highly desirable that particled foreign material such as rust, sludge or the like be precluded from entering the radiator and forming a heat insulating layer and coating in the interior thereof. The entry of rust and sludge into the automotive radiator is highly undesirable for the further reason that the circulating liquid tends to carry it to the bottom of the radiator where it accumulates and prevents free flow of the cooling liquid back to the engine.

The present invention substantially eliminates the building up of a layer of heat insulating material in the radiator as well as preventing the accumulation of such foreign material in the lower interior portion thereof, and as a result of the elimination of these two detrimental effects the engine with which the invention is used will tend to run cool.

BRIEF DESCRIPTION OF THE DRAWINGS

FIG. 1 is a perspective view of the filter assembly;

FIG. 2 is a perspective view of a radiator and flexible inlet hose in which the invention shown in FIG. 1 is disposed;

FIG. 3 is a fragmentary longitudinal cross sectional view of the radiator hose and the invention taken on the line 3—3 of FIG. 2; and FIG. 4 is an end elevational view of the filter assembly.

DESCRIPTION OF THE PREFERRED EMBODIMENT

A filter assembly A is shown in FIG. 1 that is adapted to be removably positioned in a flexible hose B that is secured to a rigid inlet tube C shown in FIG. 3, which tube extends rearwardly from the upper portion of a conventional automotive radiator D. The hose B, is removably held in sealing engagement in the tube C by a transverse circumferentially extending clamp E as shown in FIGS. 2 and 3. The radiator D is provided with a liquid filling inlet tube F that is normally closed by a cap G that is mounted thereon.

The radiator D is of conventional design, and has a liquid discharge opening (not shown) in the bottom thereof, through which cooled liquid is returned by suitable conduit means to an internal combustion engine of conventional design (not shown). The filter assembly A includes a cone shaped screen 10, preferably formed of wire mesh that permits a cooling liquid to flow therethrough, but not particles G of a foreign material such as rust, sludge or the like that are entrained with the liquid.

The screen A as may best be seen in FIG. 3 includes an apex portion 12 and a base portion 14, with the base portion having a diameter such that the screen 10 may be disposed within the interior of the tube C as shown in FIG. 3. The base portion 14 of the screen is rigidly secured to a forward and inwardly extending circular flange 16 that is preferably an integral part of a generally cylindrical member 18. The member 18 has a circular lip 20 extending outwardly therefrom as shown in FIG. 3. The cylindrical member 18 has an exterior diameter that is slightly less than the interior diameter of the tube C to permit the member to be snuggly and slidably inserted within the free end of the tube as shown in FIG. 3, with the lip 20 acting as a stop to prevent longitudinal movement of the assembly A towards the radiator D beyond the position shown in FIG. 3.

The flange 16 preferably has two diametrically spaced openings 22 formed therein that are engaged by a pair of hooks 24 formed on the free ends of a generally V-shaped wire handle 26. The handle 26 is of such size and length as to extend around the screen 10 and outwardly from the end 28 of the hose B as shown in FIG. 3.

The filter assembly A is placed in an end portion of the hose B when the clamp E is loosened and the hose is is removed from engagement with the tube C. The filter assembly A may then be placed either in the hose B or the tube C as shown in FIG. 3, and the hose then slid onto the tube C and sealingly secured thereto by tightening the clamp E. When it is desired to remove the filter assembly A from the hose B, the clamp E is loosened, and the hose B is disengaged from the tube C. The handle 26 projects outwardly from the forward end 28 of the hose B, and as a result this handle may be grasped manually to longitudinally move the screen assembly A from the tube B without any appreciable force being exerted on the screen 10. When the engine (not shown) is operated, cooling liquid H will be circulated through the hose B in the direction of the arrow 32 and entrained particles G of solid material such as rust and sludge are collected on the interior surface of the screen 10. Due to the velocity of the cooling liquid H, these particles G tend to move forwardly in the screen 10 and accumulate as a body G' thereof in the apex portion 12 of the screen. These particles G when disposed as a body G' in the apex portion 12 of the screen reduce the transverse interior area of the tube C to a minimum, and as a result there is a minimum obstruction of flow of the cooling liquid H through the tube C as the body G' of foreign material builds up in the apex portion 12 of the screen 10. Periodically the screen assembly A should be removed from the tube C and cleaned of particles G of foreign material.

After the filter assembly A has been cleaned, it is then returned to the positionn shown in FIG. 3 and is again used until a substantial body of foreign particles G' build up in the cone portion 12 of screen 10. From the previous description of the structure of the screen assembly and the manner in which it is used, it will be apparent that the interior surface of the radiator D will have a minimum of foreign material deposited thereon, and as a result the cooling liquid H should in combination with the radiator D operate at maximum efficiency in removing heat from the circulating cooling liquid. Removing of such heat from the liquid as well as the prevention of sludge building up in the lower portion of the radiator D will assure the engine (not shown) operatively associated with the radiator D running at a substantially lower temperature than would occur if the invention were not used. The base portion 14 of screen 10 is preferably secured to flange 16 by solders.

The use and operation of the screen assembly A has been previously described in detail and need not be repeated.

I claim:

1. In combination with an automotive radiator having a liquid inlet tube extending rearwardly therefrom to which a resilient hose is connected, a filter assembly of the type that includes a conical filter screen having a base portion said filter assembly being characterized by including:
   a. a cylindrical rigid member that is snuggly and slidably insertable within said tube, said member having first and second ends;
   b. a forwardly and inwardly extending rigid flange that is an integral part of said member and extends forwardly from said first end thereof;
   c. a circumferentially extending lip that projects outwardly from said second end of said member and acts as a stop to prevent said member being moved forwardly beyond a predetermined position in said tube;
   d. a V-shaped wire handle that may be longitudinally disposed in said tube, said handle of such size as to extend around said screen, and said handle having two laterally spaced first ends;
   e. first means for securing said base portion of said screen to said flange; and
   f. second means for pivotally securing said first ends of said handle to said flange, said flange and handle cooperating to permit a longitudinal force to be exerted on said filter assembly to withdraw the same from said hose without any strain being placed on said screen during such withdrawal, with said screen when cooling liquid is discharged through said tube collecting foreign particles of solid material entrained with said liquid on the interior surface of said screen, and said collected solid particles due to the velocity of said liquid tending to move forwardly in said screen to accumulate as a compact body in the apex portion thereof where said particles define a minimum of resistance to the flow of said cooling liquid through said tube, with said cylindrical rigid member serving as dual support for said lip and said flange screen and handle.

* * * * *